Oct. 30, 1951            A. SIMMON            2,573,113
COMPUTING DEVICE FOR PHOTOGRAPHIC COLOR PRINTING
PROCESSES OF MASKING TYPE
Filed Aug. 17, 1949            6 Sheets—Sheet 1
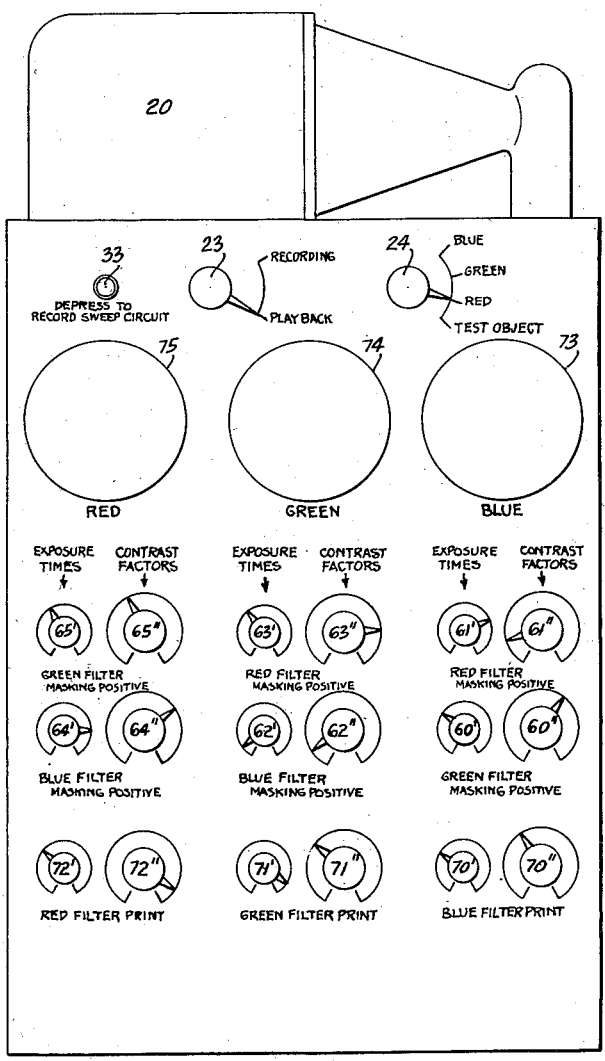
Fig: 1
Fig: 3
Fig: 4
INVENTOR:
Alfred Simmon
BY Walter S. Wollheim
ATTORNEY.

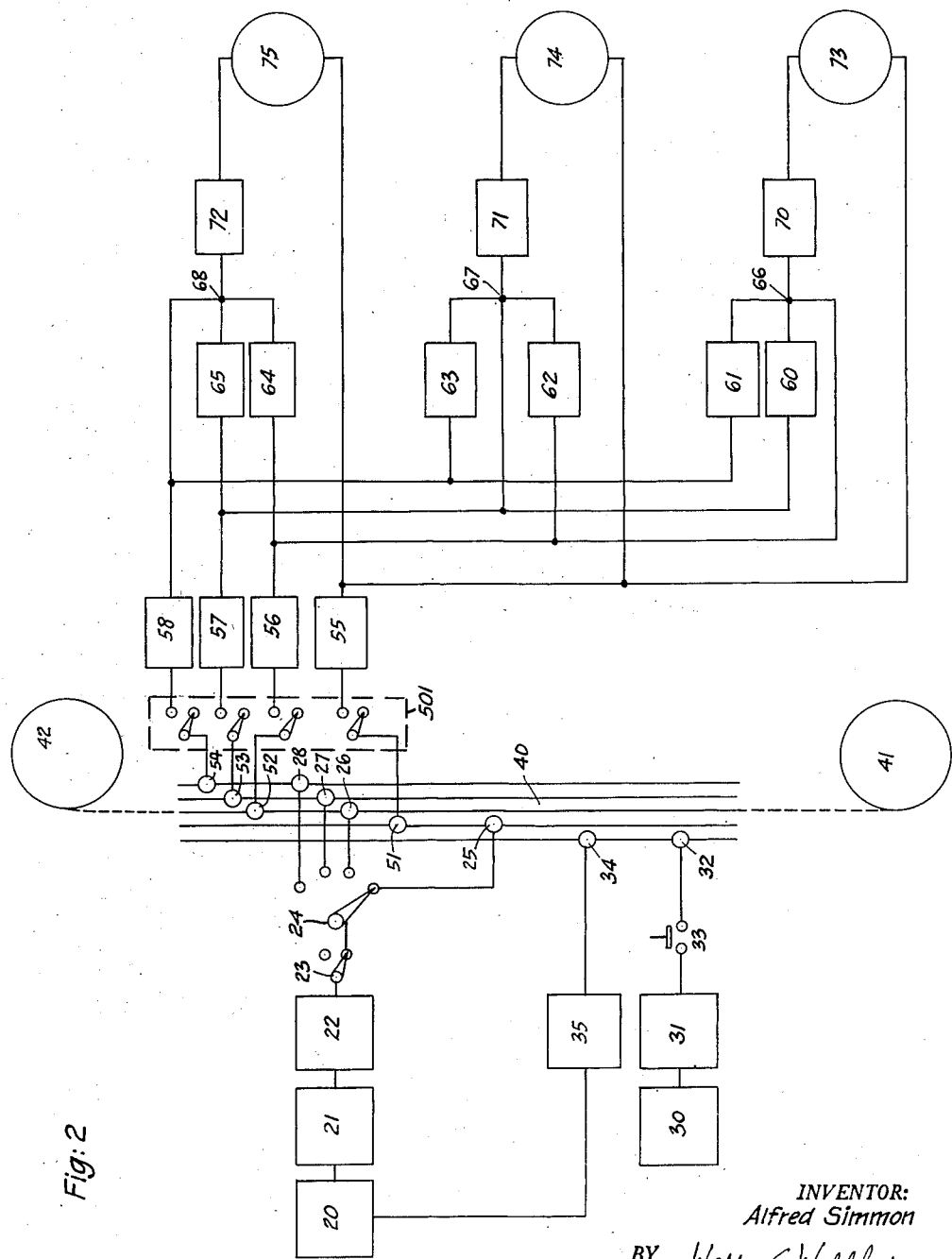

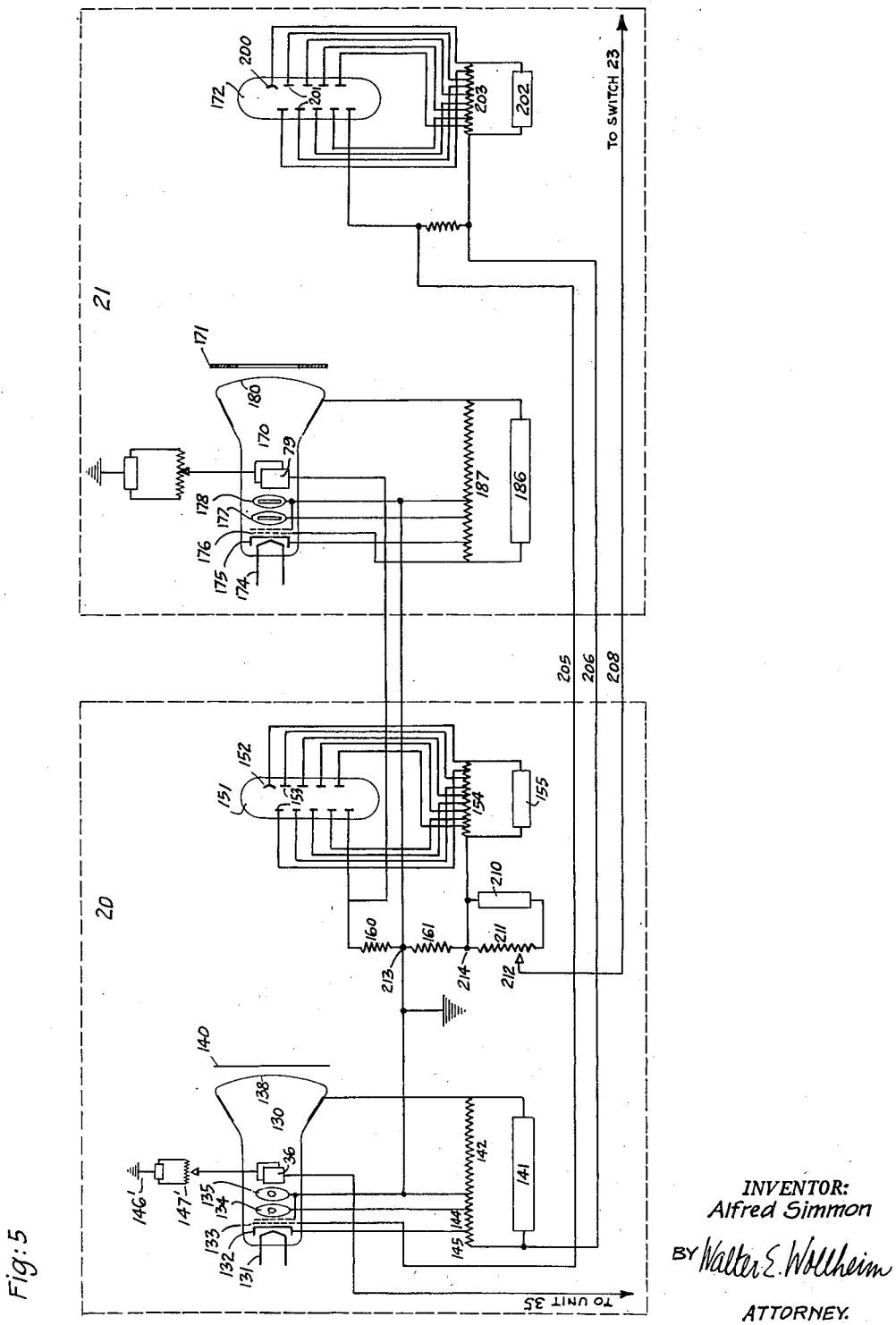

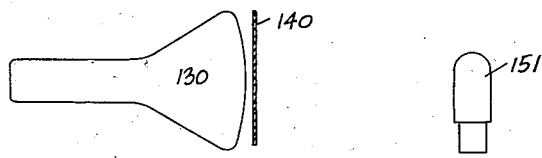
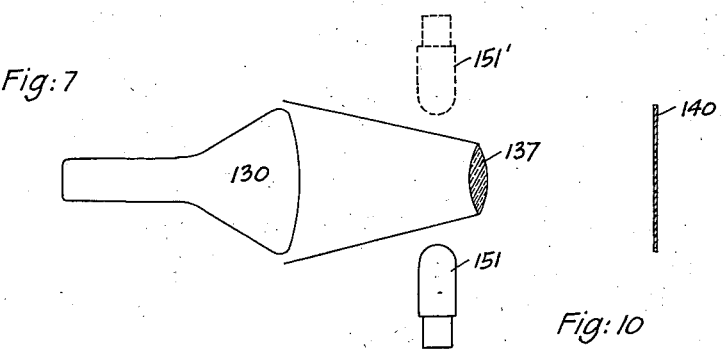
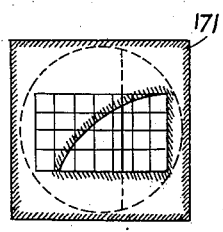
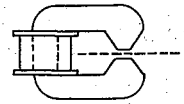
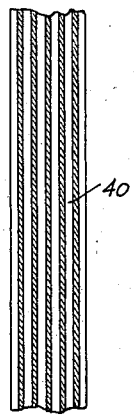
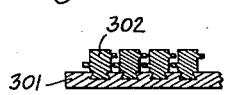
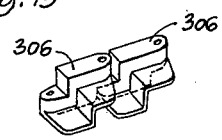

Oct. 30, 1951 — A. SIMMON — 2,573,113
COMPUTING DEVICE FOR PHOTOGRAPHIC COLOR PRINTING
PROCESSES OF MASKING TYPE
Filed Aug. 17, 1949 — 6 Sheets-Sheet 5
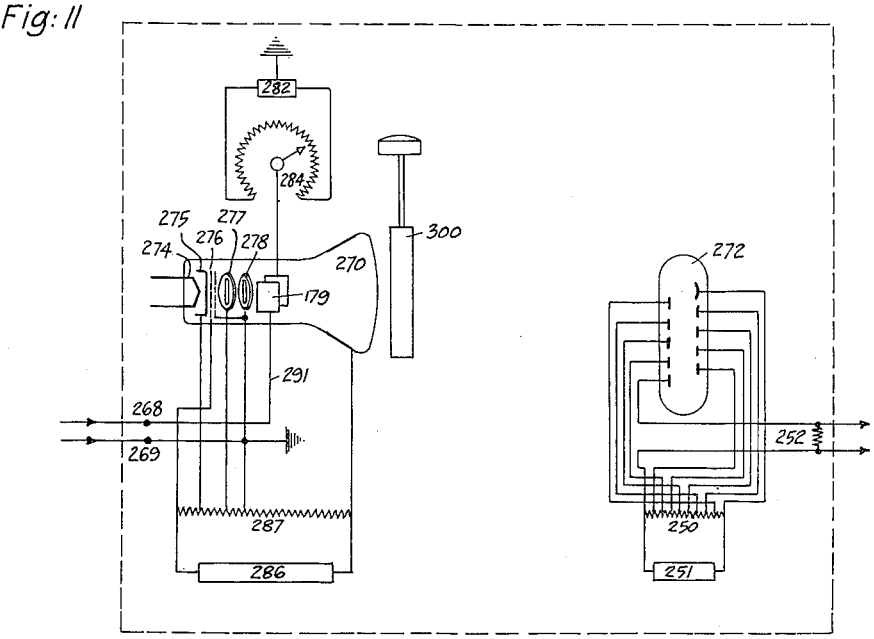
Fig: 11
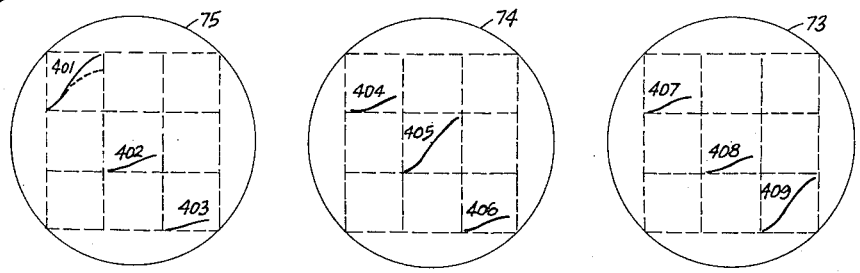
Fig: 16
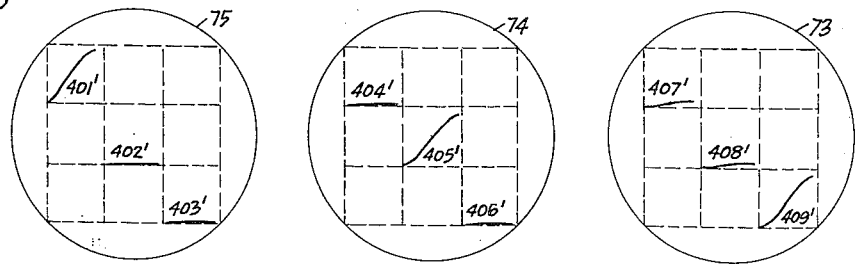
Fig: 17
INVENTOR:
Alfred Simmon
BY Walter E. Wollheim
ATTORNEY.

Oct. 30, 1951  A. SIMMON  2,573,113
COMPUTING DEVICE FOR PHOTOGRAPHIC COLOR PRINTING
PROCESSES OF MASKING TYPE
Filed Aug. 17, 1949  6 Sheets-Sheet 6
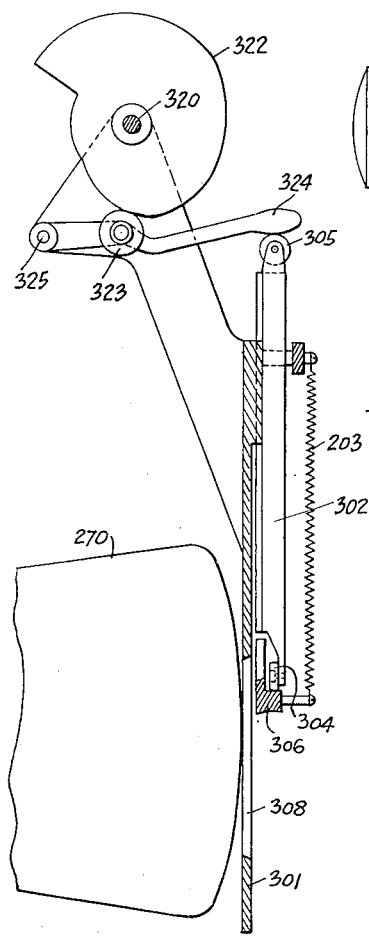
*Fig: 13*
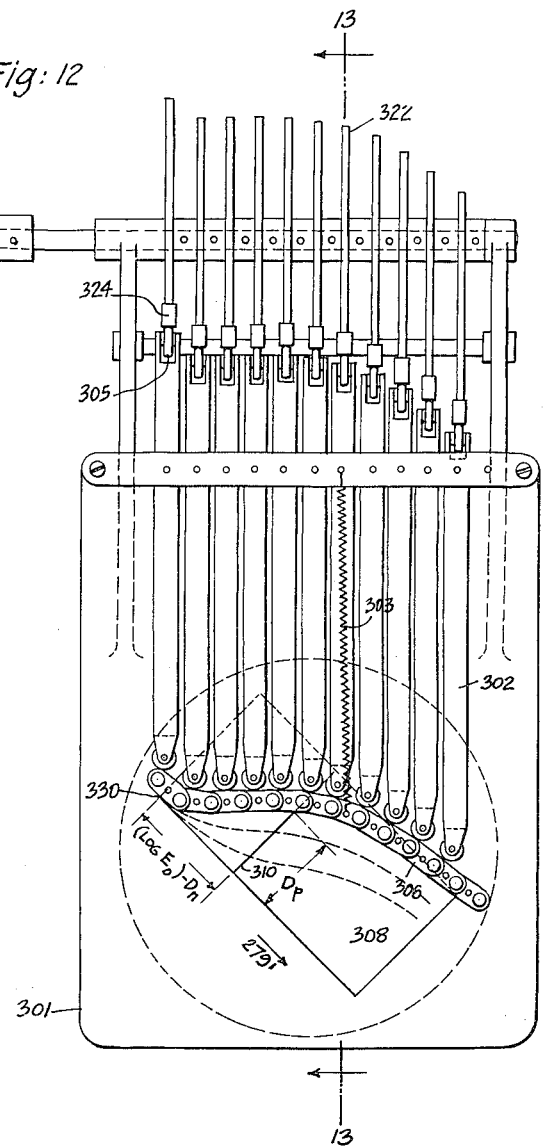
*Fig: 12*
INVENTOR:
Alfred Simmon
BY Walter E. Wollheim
ATTORNEY.

Patented Oct. 30, 1951

2,573,113

UNITED STATES PATENT OFFICE 2,573,113

COMPUTING DEVICE FOR PHOTOGRAPHIC COLOR PRINTING PROCESSES OF MASKING TYPE

Alfred Simmon, Jackson Heights, N. Y., assignor to Simmon Brothers, Inc., Long Island City, N. Y., a corporation of New York Application August 17, 1949, Serial No. 110,817

15 Claims. (Cl. 88—14)

This invention refers to photographic color printing processes which make use of three separation negatives made through filters of three primary colors, respectively, at least one of these separation negatives later being combined with one or two positives made from one or both of the two other separation negatives, respectively. In the most frequently used printing processes, separate prints are made from these "masked" separation negatives. These prints consist at first of black-and-white silver images which are developed in the usual manner. The silver is later removed by a bleaching bath and replaced, respectively, by cyan, magenta and yellow dye. These colored images are finally superimposed upon each other on a common white base.

The object of this invention is an analogue computer which permits, for separation negatives made under predetermined conditions on material of known characteristics, the predetermination of the best printing conditions for the masking positives and for the final prints made from the masked separation negatives.

The "printing conditions" referred to mean the exposure time and what shall be called the "contrast factor." The term "contrast factor," when used in these specifications, shall denote any one of the factors adapted to influence the contrast of a positive print, i. e., either the choice of a grade of sensitized material of a family of similar materials with different contrast grades, or, and that is the usual case, the time and temperature of the development process, or it may conceivably denote the color of the light to which a sensitized material has been subjected during the exposure.

A preferred embodiment of this invention is illustrated by the attached drawings, in which Fig. 1 shows the external appearance of the device;

Fig. 2 is a schematic diagram in block form of the electrical, optical and mechanical mechanism;

Fig. 3 is a test object which is analyzed by the device;

Fig. 4 is a mask which is preferably combined with the test object during this analysis;

Fig. 5 is a more detailed circuit diagram of the scanning unit and of the photocell current-density converter;

Figs. 6 and 7 show schematically the optical arrangement of the scanning unit for transparent or opaque specimens, respectively;

Fig. 8 is a mask used in the photocell current-density converter;

Figs. 9 and 10 are elements of the recording unit, preferably of the magnetic type, Fig. 9 showing the recording head, and Fig. 10 the multiple ribbon upon which the magnetic impressions are recorded;

Fig. 11 is a circuit diagram of a negative-positive converter, i. e., a device which converts currents and/or voltages representing densities of a photographic negative into voltages and/or currents representing densities of a positive print made from said negative;

Figs. 12 and 13 show an adjustable mask which forms part of the negative-positive converter;

Figs. 14 and 15 are details of this mask; and

Figs. 16 and 17 show schematically displays upon the screen of the cathode ray tubes which serve as indicating elements, Fig. 16 illustrating the condition before and Fig. 17 after the introduction of the masks.

Like characters of reference denote similar parts throughout the various drawings and the following specification.

Representation of electrical circuits

In the interest of simplicity voltage sources have in the following been represented by batteries, but it will be understood that in reality these batteries can be readily replaced by combinations of transformers, rectifiers and condensers. Linear sweep circuits or saw-tooth wave generators are shown in block form, since their detailed construction is well known and forms no part of this invention. This is also true of carrier wave generators and the modulating and demodulating circuits associated with them. Again in the interest of simplicity amplifiers have generally been shown in block form only, and it will be understood that amplifiers may be inserted in any place in the system where their presence may appear necessary. Supply circuits for the various filaments for rectifying and cathode ray tubes have been omitted. These filaments are in reality either fed from small batteries or from filament transformers in a well-known manner. All circuits used in this device are extremely sensitive to small voltage fluctuations and, therefore, automatic voltage regulators or stabilizers must be used in order to render all voltages constant in the presence of small changes of the line voltage. These stabilizers or voltage regulators have not been shown since their design is well known and since they form no part of this invention. Cathode ray tubes as well as photo-electric cells of the multiplier type require circuits involving multiple tap potentiometers. In the interest of clarity most tubes are shown to be connected to individual potentiometers, and individual batteries associated with the potentiometers, but in practice it will often be possible to connect several tubes to the same potentiometer and battery. Cathode ray tubes have consistently been shown equipped with electrostatic deflection means, but it will be understood that, if so desired, electro-magnetic deflection means can be substituted therefor.

A preferred embodiment of this invention comprises a magnetic tape recording means using a relatively wide tape accommodating a plurality of parallel magnetic tracks. This tape and these tracks are indicated schematically by dotted parallel lines. This tape coacts with recording and play-back means which comprise in a known manner iron cores and coils. These recording and play-back means are schematically indicated by circles only. Winding and unwinding means for the tape have not been shown.

*General principle*

A test object and three separation negatives made therefrom are either simultaneously or, preferably, consecutively scanned by a moving pencil of light. The transmitted light impinges upon a photo-electric cell causing a certain current to pass said cell at any given time. These currents are converted into voltages representing photographic densities and are received by a recording device and there recorded. All records are then played back simultaneously, and means are provided to coordinate these records in such a way that voltages being played back simultaneously always represent densities of corresponding points of the test object and of the three separation negatives, respectively. Some of the played back voltages are then fed into negative-positive converting units, where the voltages representing densities of a photographic negative are converted into voltages representing densities of a hypothetical positive transparency made therefrom. Some of these voltages representing densities of a positive are added to the played back voltage representing the density of one of the separation negatives in such a way that the density of the separation negative obtained through a filter of one primary color is combined with "positive" densities derived from the separation negative taken through the filter of another primary color. In the most complete case each "negative" density is modified by two added "positive" densities, although in practice, that may not always be necessary, and only one or two of the separation negatives may need this correction.

The voltage representing the corrected density of a separation negative is then sent through another negative-positive converter where it is converted into a density of a hypothetical positive print made from said corrected separation negative. Finally this "positive" density is compared to the density of the corresponding point of the original test object. This is done by impressing the voltages representing, respectively, the density of the same point on the original test object and on the final positive print upon the horizontal and vertical deflecting elements, respectively, of a cathode ray tube. The operator has means under his control to modify the electrical magnitudes representing the exposure times and the contrast factor of the masking positives and of the final prints made from the corrected negatives until the displays on the screen of the indicating cathode ray tube indicates the most satisfactory reproduction. The actual color print, i. e., separation negatives, masking positives, and final prints may then be made according to the factors which predict the best possible reproduction.

A device which incorporates this principle is shown schematically in the block diagram of Fig. 2. The test object and the three separation negatives made therefrom are inserted consecutively into the scanning unit 20 which contains a photoelectric cell. The current passing this cell is fed into the photocell current-density converter 21 and there converted into a voltage proportional to the photographic density of the point being analyzed at any given time by the scanning unit. The voltages representing densities are then used to modulate a carrier wave generated by the carrier frequency generator which forms part of unit 22. The modulated carrier frequency wave is connected to a two-step switch 23 which has two positions for "recording" and for "play-back," respectively. The contact corresponding to the recording position is in turn connected to a four-step switch 24, the four positions of which are, respectively, for the "test object" and for the blue, green and red filter separation negatives. Each of these contacts is, respectively, connected to a recording element of the recording device. These recording elements are named 25, 26, 27 and 28, respectively, and are represented in the diagram by circles only. They may, for example, represent the magnetic recording head of a wire recording device as will be described in detail later.

A sweep circuit generator 30 generates a sawtooth wave current or voltage which is amplified by the amplifier 31 and impressed upon recording head 32 when the operator depresses normally open push buttons 33. The recorded sawtooth wave voltage is then picked up by element 34, amplified by another amplifier 35 and fed into the scanning unit 20, where it serves to move the moving pencil of light, so that either the test object or one of the three separation negatives will be scanned accordingly. In this manner all recorded traces of the various densities of the test object and of the three separation negatives are coordinated, so that, when they are played back later, they will, at any given time, represent densities of the same point upon the test object and the three separation negatives, respectively.

The various densities, or rather the modulated carrier waves representing these densities are recorded upon a moving ribbon 40, which during operation is moved from a spool 41 to a second spool 42. The ribbon contains a number of tracks in parallel, so that the densities of the test object and of the separation negatives can be recorded upon it. This makes it possible to play all records back simultaneously. This recording element may, preferably, be a magnetic ribbon, as will be described later.

During the play-back period the ribbon is again moved between spools 41 and 42, and the magnetically or otherwise recorded impressions are picked up by pick-ups 51, 52, 53 and 54. The voltages generated in these pick-up elements are conducted to the four contacts of a four-circuit double throw switch 501 (see Fig. 2) which has two positions for "recording" and "play-back." This switch is mechanically connected to the aforementioned switch 23, so that both will automatically assume corresponding positions at all times. During the play-back period the four voltages generated in the four pick-up elements are fed into de-modulating units 55, 56, 57 and 58, where the carrier frequency is removed. The remaining voltages which directly represent photographic densities are then impressed upon a masking network. This masking network contains six negative-positive converters 60, 61, 62, 63, 64 and 65. In these negative-positive converters, voltages representing densities of a negative are converted into voltages representing densities of a hypothetical positive transparency printed therefrom. It can be seen that in this network always the density of one separation negative is additively combined with the densities of two hypothetical positive transparencies made from the two other separation negatives. The result, in each case, is a voltage which represents the density of a corrected separation negative. These voltages representing corrected densities are present, respectively, at the points of 66, 67 and 68. They are fed into three additional negative-positive converters 70, 71 and 72, in which they are converted into voltages corresponding to positive densities of hypothetical prints made from the corrected separation negatives. These positive densities are then compared to the densities of the corresponding points of the original object. The output voltages of the converters 70, 71 and 72 are impressed upon one of the deflection elements of three cathode ray tubes 73, 74, and 75, respectively, and the other deflection elements of these cathode ray tubes are connected to the output voltage of unit 55 which represents the photographic density of the original object as it was originally recorded. The faithfulness of the reproduction can then be judged by the shape and nature of the trace which is displayed upon the screens of the three tubes 73, 74 and 75.

Test object and separation negatives

A test object suitable for the purpose of this invention is shown in Fig. 3. It comprises three parts, and the only condition imposed upon the pattern displayed by it is that a straight line corresponding to the scanning movement of the pencil of light must intersect elements representing every conceivable density in each of the three parts. The most convenient, but not the only, pattern that will meet this condition is a system of three wedge prints as is shown in Fig. 3.

This test object may be transparent or opaque, and the optical design of the scanning unit will vary accordingly, as will be shown later.

This test speciment should be a black-and-white print made on the same material upon which the final print is to be made, and should be analyzed by the scanning unit in its black-and-white state; i. e., before bleaching and before dyeing.

After the test object has been analyzed by the scanning unit and its densities have been recorded, it is removed from the scanning unit and its chemical treatment is finished; i. e., it is bleached and its three parts are, respectively, dyed with cyan, magenta and yellow dyes.

The three separation negatives are then made from the dyed test object through filters of the three primary colors, red, green and blue. More specifically, the first separation negative is a photograph showing all three parts of the test specimen photographed through a red filter. Likewise the second and third separation negatives show all three parts photographed through green and blue filters, respectively. The significance of this procedure will be explained later. It is most convenient to make the separation negatives of exactly the same size as the test object, although this is not strictly necessary, and smaller or larger separation negatives can be accommodated, provided the range of the scanning movement of the light beam is adjusted accordingly.

External appearance and structure

The electrical elements schematically described in the preceding paragraph are housed in a cabinet 80 shown in Fig. 1 which is, preferably, of rectangular shape. Mounted on top of the cabinet is the scanning unit 20. All other elements are contained within the cabinet with the exception of those elements which are visible on the front panel. The disposition of the electrical elements within the cabinet is of no importance, and, therefore, has not been shown.

Visible on the front panel is the push button 33 which is actuated when it is desired to record, prior to the actual operation of the device, the saw tooth wave generated by the sweep circuit generator 30 and the two switches 23 and 24, the electrical function of which has been explained in the preceding paragraph, when the diagram in Fig. 2 was described.

Immediately below these switches are the three screens 73, 74, and 75 of the indicating cathode ray tubes which indicate, respectively, the densities of the final prints made from the corrected red, green and blue filter separation negatives as a function of the corresponding densities of the original test object.

Below each cathode ray tube there are two rows of dials by means of which the operator can adjust the predicted densities of the final print by controlling the assumed exposure times and contrast factors of the two masking positives to be combined with each separation negative and the exposure time and the contrast factor of the final print made from the corrected separation negative. Each pair of controls, i. e., one for the exposure time and one for the contrast factor, are, respectively, connected to one of the negative-positive converters, as will be explained in detail later. For example, contemplating the row of controls placed below cathode ray tube 75 which indicates densities of the final print made from the red separation negative, dial 65' and 65'', adjusting, respectively, exposure time and contrast factor of the masking positive made from the green filter separation negative, are associated with the negative-positive converter 65. Likewise control 64' and 64'' controlling the exposure time and the contrast factor of the masking positive made from the blue filter negative are associated with negative-positive converter 64. Finally control 72' and 72'' which adjust, respectively, the exposure time and the contrast factor of the final print made from the masked red filter separation negative are associated with negative-positive converter 72.

The controls positioned below cathode ray tube 74 and 73 are organized in exactly the corresponding manner and the markings by which they are identified on the front panel of cabinet 80 are self-explanatory.

Illuminating and scanning means

The physical appearance of these means is shown in Fig. 1. Figs. 6 and 7 show the optical arrangement for transparent and opaque specimens, respectively. The electrical circuit is shown schematically in Fig. 2, and in detail in Fig. 5.

The test object and the three separation negatives are consecutively illuminated by a moving pencil of light. The light may be provided by any convenient source, such as incandescent or carbon arc lamps and, likewise, scanning means of any convenient design are applicable, such as for example rotating discs with suitable apertures on their periphery, or rotating or otherwise moving mirrors or lenses. In practice, however, it is preferred to use a cathode ray tube because in this manner all mechanical moving parts are avoided, and because the light output of a cathode ray tube can be most conveniently regulated by changing the voltage impressed upon a control grid.

If we deal with a transparent specimen, this specimen 140 as shown in Fig. 6 may be disposed immediately in front of a cathode ray tube 130. Part of the light penetrating the specimen then impinges upon photo-electric cell 151.

If we deal with an opaque specimen, a lens 137 projects an image of the luminous spot of the screen of the cathode ray tube upon the specimen 140, as shown in Fig. 7. Part of the light reflected by this specimen then impinges upon the photo-electric cell 151. In this case it may be expedient to use more than one photo-electric cell, and a second one 151' is shown in dotted lines. In this case it is desirable to provide barriers or baffles to prevent any light of the luminous spot from reaching the photo-electric cell or cells directly. This has been shown in Fig. 7.

The photo-electric cell or cells must, of course, be placed in such position relative to the opaque specimen that they receive only diffused light, in other words, are not struck by specularly reflected light.

It shall, of course, be considered within the scope of this invention to employ alternatingly the optical arrangements shown, respectively, in Figs. 6 and 7 since, for example, an opaque test object may be used, whereas the separation negatives will usually be transparent.

In Fig. 1 the arrangement corresponding to Fig. 6, i. e., adapted for a transparent specimen, has been shown. The left part of unit 20 houses the cathode ray tube 130 and the right part of the photo-electric cell 151. Both are connected by a hollow body which has a shape of a truncated cone or truncated pyramid.

It is usually desirable to provide mechanical means to adjust the test specimens with reference to the cathode ray tube, so that corresponding points of the test object and of the three separation negatives have the same relative positions with respect to the cathode ray tube. Therefore, these adjusting means may, preferably, comprise means to shift the specimens horizontally and vertically, as well as to rotate it. Adjusting devices of this type are well known in machine tool practice, and are also incorporated for example in some microscopes, and their detailed construction has, therefore, been omitted from these specifications.

Referring to Fig. 5, the cathode ray tube 130 is used as an illuminating means. Its component elements comprise filament 131, indirectly heated cathode 132, control grid 133, two focusing elements 134 and 135, and one pair of deflection plates 136. The front of the tube carries in the usual manner a light emitting screen 138.

The supply circuit for this tube is largely conventional, comprising a battery 141, connected to a potentiometer 142 with a number of taps which are connected to the elements of the cathode ray tube in the usual manner, as shown in Fig. 5.

It can be seen that the control grid assumes a certain negative potential relative to cathode 132. This negative bias consists of two parts, a fixed part which corresponds to the extreme left end of the potentiometer, i. e., to the voltage between points 144 and 145, and a variable part which is derived from the photo-electric cell through the photocell-density converter which will be described in detail later.

The deflection plates 136 are connected to a linear sweep circuit which causes the luminous spot on the screen to move over the screen area in a straight line.

The arrangement used in this circuit differs from the conventional circuit used for television or the like. Usually sweep circuits are directly connected to the deflection plates. Here, however, the voltage and/or current waves are first recorded, the records are subsequently played back, and the played back currents and/or voltages are then impressed upon the deflection means. The advantages of this indirect way of energizing deflection means by linear sweep circuits will be explained later.

In the preferred embodiment of this invention the recording means are assumed to comprise a magnetizable tape which during recording is moved past magnetizing means which are energized by the currents and/or voltages to be recorded. The magnetizable ribbon is wide enough to accommodate a plurality of magnetic tracks. This is shown in Fig. 2 schematically by a number of vertical dotted lines, and in more detail in Fig. 10. The magnetizing means comprise in a known manner an iron core of suitable shape associated with a coil which the currents to be recorded pass, as shown in Fig. 9. This iron core has a suitably shaped gap through which the ribbon is moved during operation. In the diagram of Fig. 2, these magnetizing means are indicated schematically by circles.

For reasons which will become clear later, it is necessary either to use the same magnetic assemblies as recording as well as play-back means, or if separate means for each purpose are employed, the distance between any pick-up head and the corresponding play-back head must be the same for all units. The latter case is the one which has been shown in the diagram of Fig. 2.

The function of the deflection circuit can now be understood from Fig. 2. Before the actual operation of the device contact 33 is closed, so that the current or voltage generated by the sawtooth wave generator 30 and amplified by amplifier 31 is impressed upon the recording head 32. During the subsequent operation, contact 33 is open and the magnetic impressions are picked up by head 34, amplified by amplifier 35 and conducted to one of the deflection plates 136.

Provisions must be made to render the effect of the light persistence of the screen of the cathode ray tube harmless. This can be done to a large measure by choosing the chemical composition of the screen properly. In this manner the light persistence can be reduced to a relatively small magnitude, and the remaining effect can be rendered negligible by reducing the scanning speed of the luminous spot upon the screen, or in other words, by using a relatively low frequency for the two saw tooth wave circuits which actuate the deflection plates 136.

It must be kept in mind that the absolute value of the light persistence is not important, but only its ratio to the scanning speed of the device. It will be understood that for the purpose of this invention scanning speeds may be very much lower than those used for television work. For example, whereas thirty frames per second are customary in television work, one frame per second, or even less, would be quite acceptable for the purpose of this invention.

*Means to measure light intensity*

The most important part of these means is a photo-electric cell which may be of any desired type known in the art, but in practice a so-called photo-electric multiplier is preferred, since additional amplifiers are usually unnecessary for this type of tube. Referring to Fig. 5, this cell comprises a glass vessel 151 within which the photosensitive cathode 152 and nine additional electrodes 153 are mounted. These elements are connected to respective points of the potentiometer 154 upon which a voltage is impressed by battery 155 or an equivalent source of voltage. The cathode 152 is connected to the most negative points at the extreme right of the potentiometer, and the last electrodes are connected to the extreme left point of their respective potentiometer, so that they receive the most positive potential. The wire connecting the left end of each potentiometer to the last electrode is interrupted and two resistors 160 and 161 are inserted in this circuit. During operation, voltages, depending upon the resistance values of these resistors and upon the current circulating in the last loop of the photo-electric multiplier circuit, are built up across these resistors.

The distance of the photocell from the transparency and from the screen of the cathode ray tube must be sufficiently large so that all points of said transparency have substantially the same distance from the cell.

The light reaching the photo-electric cell from the screen of the cathode ray tube can be magnified by placing suitably shaped light collecting elements between screen and photocell. These light collecting elements may, for example, be truncated cones or pyramids with an inner reflecting surface, or they may be solid bodies made from glass of transparent plastic in which case the light would be directed toward the photocell by total reflection along the boundaries.

*Photocell current-density converter: General principle*

The current passing photocell 151 is proportional to the intensity of the light which passes the specimen being analyzed, i. e., the test object or one of the separation negatives. Since it is desired to compare densities rather than light intensities, means must be provided to produce currents or voltages which are proportional to the densities to be measured. This is the purpose of the photocell-density converter. Therefore, this converter may comprise suitable networks with a non-linear response in such a way that the photocell currents fed into them are proportional to the intensity of the impinging light, and that the currents or voltages delivered by this converter are proportional to the corresponding densities. Many networks with non-linear responses are known, comprising for example non-linear resistors, vacuum tubes, saturated iron cores and similar elements. Regardless of the detailed design, however, such an arrangement would suffer from the very serious disadvantage that the photocell currents themselves would have to be proportional to light intensities, and if one measures up to density 3, the light intensities and therewith the photocell currents would vary in the proportion 1:1000. It is very inconvenient, if not impossible, to design circuits which will satisfactorily cover such an exceedingly wide range, and it is preferred therefore, to solve the problem in the following manner: The intensity of the light impinging any given point of the specimen is modulated in accordance with the transmitted or reflected light intensity. This is done by the photocell itself, and a voltage which is a function of said photocell current is impressed upon the grid 133 of the cathode ray tube 130, changing its light output. In this manner the fluctuations of the light impinging upon the photo-electric cell 151 are reduced, and it is now even possible to modulate the light intensities in such a manner that the resulting photocell currents become directly proportional to density values.

The converting circuit which accomplishes this function is shown schematically in block form as number 21 in Fig. 2, and in detail in Fig. 5, and is described in the next two paragraphs.

*Photocell current-density converter: Mathematical basis*

The photocell output current or, more specifically, the voltage impressed upon a resistance 160, is fed into the converting circuit. The output voltage of this circuit is then impressed upon the grid of the cathode ray tube and used there to modulate the brightness of the luminous spot formed on the screen. It is, therefore, clear that the converting circuit must deliver an output voltage which is a definite mathematical function of the input current or voltage. This mathematical function will be derived as follows:

The current passing the cathode ray tube can be expressed within certain limits by the formula $$I = I_{max} - ae \qquad (1)$$

I is the current passing the cathode ray tube at any given instance, and $I_{max}$ is the maximum permissible cathode ray tube current. This value may be determined either as the maximum current that the screen of the tube will withstand without deterioration, or it may be the maximum value for which the linear relationship between cathode ray tube current and grid bias still holds true, or it may be determined by any other convenient consideration. Both I and $I_{max}$ are conveniently expressed in microamps ($\mu a$). $e$ is the additional negative voltage impressed upon the control grid 133 which is added to the voltage impressed upon these grids by the left end of potentiometer 142. In other words, the left end of potentiometer 142 imposes a certain constant minimum negative voltage upon the grid at all times, and the voltage $e$ which is the output voltage of the converting circuit will be added thereto. $e$ is expressed in volts. $a$ is a constant which depends upon the characteristics of the individual cathode ray tube and which has a dimension $$\frac{\mu a}{\text{volts}}$$

The light intensity on screen 138, i. e., before the light has passed the reproduction of the original object, is again within reasonable limits directly proportional to the cathode ray tube current or $$L_1 = bI \quad (2)$$

$L_1$ is expressed in foot candles, or any corresponding metric dimension, and $b$ is a constant again depending upon the characteristic of the cathode ray tube, measured in $$\frac{\text{foot candles}}{\mu a}$$

The light intensity, after the light has passed the transparency, is expressed by $$L_2 = L_1 \cdot 10^{-D} \quad (3)$$

where D is the density of the test object or separation negative at the point which, at any given distance, is illuminated by the luminous spot of the cathode ray tube.

The light intensity in the plane of the photosensitive cathode of the photo-electric cell 151 is proportional to $L_2$ but, of course, considerably smaller depending upon the distance between the two tubes.

$$L_3 = dL_2 \quad (4)$$

$d$ is a dimensionless constant.

The photocell current is again within wide limits proportional to the light impinging upon the photo-electric cell or $$i = f \cdot L_3 \quad (5)$$

where $f$ is a constant denoting the light sensitivity of the photo-electric cell in $$\frac{\mu a}{\text{foot candles}}$$

The condition shall now be imposed that the converting circuit shall deliver $e$ as a function of $i$, i. e., output voltage as a function of input current, in such a way that differences of photocell currents shall become directly proportional to density differences of the specimen to be measured, or $$i_1 - i_2 = h(D_2 - D_1) \quad (6)$$

$h$ is a proportionality factor which has the dimension of a current and which is expressed in $\mu a$.

$D_1$ and $D_2$ are the photographic densities of two points of the specimen, and $i_1$ and $i_2$ are the corresponding photocell currents, i. e., the currents which are measured when the luminous spot of the cathode ray tube is placed, respectively, behind the two points with the two densities $D_1$ and $D_2$.

Equations 1, 2, 3, 4 and 5 can be combined and solved for D with the following result $$D = \log\left[\frac{bdf}{i}(I_{max} - ae)\right] \quad (7)$$

for $D = D_1$, there is, of course $i = i_1$ and $e = e_1$ and likewise for $D = D_2$ there is $i = i_2$ and $e = e_2$. By substituting these values, the following expression is arrived at for $D_2 - D_1$:

$$D_2 - D_1 = \log\left(\frac{I_{max} - ae_2}{i_2}\right) - \log\left(\frac{I_{max} - ae_1}{i_1}\right) \quad (8)$$

$D_2 - D_1$ can also be computed from Equation 6:

$$D_2 - D_1 = \frac{i_1 - i_2}{h} \quad (9)$$

In the two Equations 8 and 9, $e_2$ becomes zero, and $i_2$ becomes $i_{min}$ for $D_2 = \Delta_{max}$, where $\Delta_{max}$ is the highest density within the measuring range of the device. $\Delta_{max}$ usually need not exceed the value 3.

$$\Delta_{max} - D_1 = \log\left(\frac{I_{max}}{i_{min}}\right) - \log\left(\frac{I_{max} - ae_1}{i_1}\right) \quad (8a)$$

$$\Delta_{max} - D_1 = \frac{i_1 - i_{min}}{h} \quad (9a)$$

These two equations can be combined and solved for $e_1$ with the following result:

$$e_1 = \frac{I_{max}}{a}\left[1 - \frac{i_1 \cdot 10^{-\frac{i_1}{h}}}{i_{min} \cdot 10^{-\frac{i_{min}}{h}}}\right] \quad (10)$$

This is the mathematical function according to which the converting circuit must work, i. e., when the spot of a cathode ray tube passes a point with the density $D_1$, a photocell current $i_1$ will be generated which, by the converting circuit, will be changed into a voltage $e_1$ which is then impressed, in addition to a constant negative bias, upon the control grid of the cathode ray tube.

The converting circuit can be simplified by not adding a voltage according to Formula 10 to the fixed negative bias, but deducting a voltage therefrom which corresponds merely to the second term in the bracket of Formula 10, i. e., $$e_1' = \frac{I_{max}}{a} \cdot \frac{i_1 \cdot 10^{-\frac{i_1}{h}}}{i_{min} \cdot 10^{-\frac{i_{min}}{h}}} \quad (10')$$

The value $i_{min}$ which appears in Formulae 10 and 10' is the minimum current which will pass the photocell when the density of a point illuminated by the cathode ray tube spot becomes $\Delta_{max}$, which is the maximum density which the devices shall be capable of measuring and which rarely, if ever, needs to exceed the value of 3. $I_{min}$ can be computed from the Formulae 1 to 5 by substituting $\Delta_{max}$ for D and by making $e_1$ zero, i. e., $$i_{min} = bdfI_{max} \cdot 10^{-\Delta_{max}} \quad (12)$$

Of ultimate interest, however, are not density differences, but absolute values of densities, and these are obtained from a network which comprises a resistor 161 carrying the photocell current of cell 151 and which is in series with potentiometer 211 receiving, in turn, a voltage from a battery or other source of voltage 210. The connection of the battery must be so chosen that the polarity of potentiometer 211 is opposed to that of resistor 161 or, in other words, the voltage between the sliding contacts 212 of the potentiometer and post 213 is the difference of the respective voltage impressed upon 211 and 161. The function of this network can be explained as follows:

Assuming that the resistance of 161 is R, and that the voltages corresponding to photocell currents $i_1$, $i_2$, are $E_1$ and $E_2$, Equation 6 can be transformed to read:

$$E_1 - E_2 = -hR(D_1 - D_2)$$

For $D_1 = 0$, $E_1$ will become $E_{max}$, so that we have $$E_{max} - E_2 = +hRD_2$$

This means that if a voltage equal to $E_{max}$ is impressed between points 212 and 214 which is opposed to the voltage impressed upon 161, that then the voltage between points 213 and 212 is directly proportional to the density $D_2$ of that point which at any given distance is illuminated by the scanning beam of the cathode ray tube 30.

If one has transparent test specimens such as presupposed up to this time, the adjustment of the sliding contact 212 of potentiometer 211 is particularly easy because all one has to do is to remove the test specimen 140 altogether so that one has zero density, and then adjust sliding contact 212 until the voltage between points 213 and 212 becomes zero. With an opaque test specimen this adjustment is a little more difficult because even a completely unexposed white piece of paper is not of zero density because it reflects less than 100% of the incident light. However, this reflectivity can be measured by other well known means, and the device can then be adjusted accordingly making proper allowance for the fact that the maximum reflection may be, for example, of the general order of 90%.

*Photocell current-density converter: Preferred design*

The design of the converting circuit itself is basically of no importance and any circuit which will convert input current into output voltage according to Formulae 10 or 10' will be satisfactory. A preferred converting circuit, however, has been disclosed in my copending application, Serial #793,666, now Patent #2,467,057, and will be described as a preferred example in the following:

A converting circuit built accordingly consists of three principal parts, cathode ray tube 170, stationary mask 171 and photo-electric cell 172. It is emphasized that the cathode ray tube 170 and the photo-electric cell 172 are in no way identical with elements 130 and 151 which have been described above. They are entirely independent therefrom and perform entirely different functions.

The broad principle of the converting circuit is that in some suitable manner a luminous line is formed on the screen of the second cathode ray tube 170, that the incoming signal which in this case is the current passing the first photocell 151 is used to deflect this line in a direction at right angles to itself and that, thereby, part of the light emitted by this line is cut off by the stationary masks placed in front of the luminous screen of tube 170. The light permitted to pass these masks is then made to impinge upon the second photo-electric cell 172 forming part of the converting circuit, but not upon tube 151. The current passing this second photo-electric cell 172 or, more precisely, the corresponding voltage impressed upon a resistor of suitable magnitude, is then supplied as additional bias to the control grid 133 of the original cathode ray tube 130 which scans the specimen in the manner described.

These circuits are shown in detail as the right half of Fig. 5. The cathode ray tube 170 contains a filament 174, cathode 175, heated thereby, control grid 176, two focusing members 177 and 178 including a second control grid, one pair of deflection plates 179 and a screen 180 capable of light emittance.

The luminous line can be formed upon this screen by any desired means, for example, by giving the focusing elements 177 and 178 the proper configuration. It would also be possible to use a conventional cathode ray tube with two pairs of deflecting elements and form a luminous spot upon its screen which is, in turn, transformed into a luminous line by means of a separate sweep circuit of high frequency. In this case, a filter of proper electrical dimensions must be added to the photocell circuit to avoid the output signal of the converter being modulated accordingly.

The rest of the supply circuit for the second cathode ray tube is conventional. It consists of a battery 186 and potentiometer 187, the various points of which are connected to the elements within the cathode ray tubes in such a way that the control grid 176 assumes a fixed negative potential with respect to the cathode 175, but that 177 has a positive potential with respect to 175, 178 a positive potential with respect to 177, and the screen finally a positive potential with respect to 178.

In front of the screen and, preferably, immediately adjacent thereto is mask 171 which is again shown in Fig. 8. This mask has an aperture which directly represents the mathematical function expressed in Formula 10'. This formula may be written as follows:

$$e_1' = \frac{\left(\frac{I_{max}}{a}\right)}{i_{min}\cdot\left(10^{-\frac{i_{min}}{h}}\right)} \cdot i_1 \cdot \left(10^{-\frac{i_1}{h}}\right)$$

The configuration of a proper mask may therefore be expressed by the equation $$Y = \frac{A}{C} \cdot X \cdot \left(10^{-\frac{X}{B}}\right)$$

Here X and Y represent coordinate values in a system of rectangular coordinates and A, B, C are constants in such a way that $A$ is proportional to $\frac{I_{max}}{a}$ $B$ is proportional to $h$ and $C$ is proportional to $i_{min} \cdot \left(10^{-\frac{i_{min}}{h}}\right)$ The mask is a thin plate made of opaque material, such as black paper or sheet metal, and its vertical width varies as a function of the horizontal distance from a point of reference 190 in accordance with Formula 10'. For convenience, the lower borderline of this aperture is made a straight line, but this is not necessary and both the upper and lower borders may be curved as long as the vertical width of the aperture is the desired function of the horizontal distance from the point of reference 190. It can be seen that only that part of the light emitted by the luminous line 191 which is behind said aperture can pass and that the other parts which are shown in dotted lines above and below this portion are blocked off. The light impinging upon the second photo-electric cell 172 is, therefore, proportional to the length of that portion of line 191 which appears behind the aperture or is a direct function of the shape of said aperture, in other words, varies in accordance with Formula 10', provided the aperture is fabricated correctly.

The respective distance between photo-electric cell 172 and the cathode ray tube 170 must, of course, be large enough so that all points of the luminous line have substantially the same distance from the photo-sensitive cathode of the photo-electric cell 172. This cell may again be of any desired design and again photo-electric multiplier tubes have been shown because then complicated amplifiers can be avoided. It again has a photo-sensitive cathode 200, and nine additional electrodes 201. The supply circuit comprises a battery 202 and a potentiometer 203, the various points of which are in the usual manner connected, respectively, to elements 200 and 201. The wire between the extreme left point of the potentiometer 203 and the last electrode is again interrupted to receive a resistance element 204. The voltage impressed upon this resistance element by the current passing it represents directly the value $e_1'$ used in the Formula 10'. $e_1'$ is then by means of two wires 205 and 206 fed back into the grid control of the first cathode ray tube 130, i. e., voltage $e_1'$ is deducted from the constant negative bias which control grid 133 has with respect to cathode 132.

*Density recording device*

The output current of the photocell current-density converter, or in the specific case described in the preceding paragraph, the current passing the photo-electric cell 151 corresponding to the voltage between points 212 and 213, Fig. 5, is fed into a suitable recording device. This is done four times in succession, i. e., for the test object and for the three separation negatives, respectively.

This recording device may be of any convenient design. It can, for example, be a mechanical device similar to a phonograph record, or it may be a light-sensitive film forming a record somewhat in the manner of a sound track. As the most convenient method the use of a so-called magnetic wire or a magnetic tape recording device is preferred, i. e., a device which comprises a ribbon of magnetizable material which during recording is moved past a magnetizing device and which can be played back by moving it in a similar manner past a magnetic pick-up. The ribbon is wide enough to accommodate a plurality of magnetic tracks, and is during operation moved from one storage reel to another.

This ribbon is shown schematically in the diagram of Fig. 2 by five dotted lines and is again shown in more detail in Fig. 10. A typical example of a magnetic assembly which can serve as recording as well as play-back or pick-up unit is shown in Fig. 9. Units serving as recording or pick-up heads are of substantially identical design, but may conceivably have coils or different impedances.

In a known manner the speed with which the ribbon is moved is kept constant, for example by the use of a synchronous motor, and, if desired, automatic reversing means for the reels may be incorporated so that a substantially continuous play is obtained. Generally amplifiers of suitable design are used both during recording and during the play-back cycle which are indicated in Fig. 2. The exact construction of these recording machines as used for the present invention is not important, and they have been shown in Fig. 2 merely schematically.

The signal to be recorded contains a D. C. component which cannot be neglected, and the device differs in this respect from sound recording means. That the recording of the D. C. component is necessary becomes clear by considering that otherwise areas of uniform density, whether they be black, gray or white, would not register on the recording means and could, therefore, later not be reproduced.

Since the magnetic recording is inherently incapable of recording a D. C. component, a carrier frequency is used which is high compared to the frequency of the A. C. component of the signal. The carrier frequency is modulated in accordance with the incoming signal, and in a similar manner during the play-back cycle the obtained signal is demodulated before it is fed into the indicators. Modulating and demodulating devices of this type are well known in radio practice and, are therefore, only shown schematically in block form in Fig. 2.

The magnetic ribbon is shown schematically as 40 in Fig. 2, where it is represented by five dotted lines which denote as many magnetic tracks, and in detail in Fig. 10. One of these tracks is used for the sweep circuit as described in a previous paragraph, and the four other tracks denote, respectively, densities of the test object and of the three separation negatives. The output current or voltage of the photocell density converter 21, more specifically, the voltage between points 213 and 212 of Fig. 5 as carried by wire 208, is impressed upon the modulating unit 22 which includes a carrier frequency generator. The modulated carrier frequency wave is then impressed upon one of the four magnetic tracks of ribbon 40. This is done by means of four magnetic recording heads 25, 26, 27, 28 which are shown schematically by circles only in Fig. 2. The four heads are connected selectively to unit 22 by switch 24.

During the play-back cycle the magnetic impressions registered upon ribbon 40 are picked up by the magnetic pick-up heads 51, 52, 53, 54. In this manner all magnetic records will be played back simultaneously and the records picked up by them are fed into the demodulating units 55, 56, 57 and 58. These demodulating units are only shown schematically, since their design is well known and forms no part of this invention. Since the carrier frequency is removed there, the output voltages of these units directly correspond to the densities as originally measured and recorded.

*Means to coordinate records*

The four records denoting densities of the test object and of the separation negatives are made consecutively one at a time, but during the play-back period they are all played back simultaneously. Obviously it becomes necessary to coordinate them in such a way that points of the four records moving pack the pick-up heads at the same time denote densities of the same element of the test object and of the corresponding element of the three separation negatives. Were the deflection plates of the scanning tube 130 energized by a directly connected conventional sweep circuit, the probability of obtaining this objective would be very small indeed, and therefore special means must be provided to assure this coordination.

These coordinating means comprise essentially the peculiar design of the sweep circuit for the deflection plates 136 which has been described in a previous paragraph. In other words, these deflection means are not connected directly to the sweep circuit, but the sweep circuit current or voltage is first recorded and then during each of the four recording cycles for the test object and the separation negative played back, and the deflection means energized from these played back recordings. In this manner any part of the tape 40 has a very definite relation to the position of the scanning beam of tube 130, and this scanning beam will always occupy the same space within the tube whenever the same part of the tape 40 passes the recording or pick-up heads. Therefore, the five tracks on tape 40 may be conceived as to contain sets of five coordinated points, one of these points denoting the position of the luminous spot upon screen 138 and the four others denoting, respectively, the density of the same point of the test object and each of the separation negatives. It is, of course, assumed, as has been pointed out before, that object and reproduction have the same physical size and and that both occupy the same relative position with respect to screen 138.

It now becomes clear why the respective distance between corresponding recording and pick-up heads must be of precisely the same magnitude. During the recording period the four heads 25, 26, 27, 28 record densities, respectively, of the test object and the three separation negatives, and consequently all points of these four tracks which denote densities of the same point of the test object and the three separation negatives, respectively, have a very definite position relative to each other. This relation would be disturbed unless the corresponding pick-up heads 51, 52, 53 and 45 have again the same position relative to each other, or what means the same, the distance between 25 and 51 must be precisely the same as the distances 26—52, 27—53, 28—54. If this condition is not met, phase shifts would be introduced between the various tracks and during the play-back period densities would be played back at any given time which do not denote the same original point of the test object and the separation negatives. It is conceivable to solve the problem in a very simple manner by using the same magnetic assemblies as play-back and pick-up heads. In the interest of clarity, however, this has not been shown in the diagram of Fig. 2.

Means to play back recorded densities

During the play-back cycle, the magnetized ribbon is moved past the magnetic assemblies 51, 52, 53, 54 which serve as pick up heads. The picked up signal contains the carrier frequency and must, therefore, be demodulated. The demodulated circuits are shown in Fig. 2, schematically in block form only, and are designated as 55, 56, 57, 58.

It may be mentioned that the play-back velocity of ribbon 40 must not necessarily be equal to the recording speed, but could conceivably be made faster. This would have the advantage that a continuous display on the screens of tubes 73, 74, 75 is obtained, even if the recording speed is made very slow, which may be desirable in order to render effects of light persistance on the screen of the original scanning tube 130 negligible.

Negative-positive converting unit

Masking means the combination of a separation negative made through a filter of one primary color with at least one positive transparency printed from a separation negative made through a filter of another primary color. An analogue computer adapted to trace this process must, therefore, contain one or several component units which permit the conversion of voltages representing densities of a photographic negative into voltages representing densities of a positive print, which may be transparent or opaque, made upon sensitized material of a given type and under given exposure times and contrast conditions. Likewise, the final print which is made from the masked separation negatives again requires this conversion. The analogue computer which is described in these specifications, therefore, contains several, in the most complete case nine, negative-positive converting units. These units are of substantially identical design, which will be described in the next paragraph.

The negative-positive converting unit is very similar to the photocell current-density converter described above, except that it lacks the feed-back feature; i. e., it again consists of a cathode ray tube, a mask and a photo-electric cell, but the photocell current in this case does not exert any influence upon the brilliancy of the luminous line formed upon the screen of the cathode ray tube.

Referring to Fig. 11, we have a cathode ray tube 270 with a filament 274, an indirectly heated cathode 275, a control grid 276, two focusing members 277, 278, and a set of deflection plates 179. These elements are connected in the customary manner to the various taps of a potentiometer 287 which, in turn, is energized by a battery 286. One of the deflection plates 279 is connected by a wire 291 to a source of voltage representing the density of a photographic negative. The other deflection plate is connected to potentiometer 284 which receives voltage from a battery 282, the center point of which is grounded. In other words, the deflection of the electron beam is made proportional to the voltage by the points 268 and 269 which represents the negative density at any given instance.

The cathode ray tube 270 must again be provided with means causing the stream of electrons to form a luminous line upon the screen. These means can again be properly shaped focusing members or, again, a linear sweep voltage of a high frequency can be impressed by means of a linear sweep circuit upon a second pair of deflection plates, which, however, has not been shown.

It will be clear from the description up to this point that by this arrangement a luminous line is formed upon the screen of cathode ray tube 270 which is deflected at right angles to itself in accordance with the density of the photographic negative measured at any given instance. Only a portion of the light emitted by this line can reach the photoelectric cell 272, and the magnitude of this portion depends upon the width of the aperture of the mask 300 at the place to which at any given time the luminous line on the screen of tube 270 is deflected.

The aperture of that mask, therefore, must directly represent the function between positive density and the exposure to which the positive sensitized sheet is subjected.

The shape of this curve is well known, and a family of curves representing this function is, for example, shown in Figure 12.5 on page 210 of the book "Fundamentals of Photographic Theory" by James and Higgins, John Wiley and Sons, New York, 1948. It is known that the shape of this curve depends not only upon the grade of paper selected but also upon its development and, in the case of some papers, upon the color of the light to which it has been exposed. Since it is the purpose of the apparatus to determine the optimum print conditions, it is desirable to use a mask with an aperture with an adjustable shape so that the operator can adjust this aperture to various shapes until the best print conditions are obtained as indicated by an indicating member which will be described in the following paragraph. A mask of adjustable shape is shown in Figs. 12 and 13.

The mask consists of a base 301 which is placed immediately in front of the screen of the cathode ray tube 270. All other components of this adjustable mask are mounted on this base. These components comprise a number of slidable members 302 each carrying a roller 304 on its lower and a roller 305 on its upper end, all of which are adapted to slide in vertically arranged grooves forming part of the base 302. The lower rollers are in contact with parts 306 which are shown in detail in Fig. 13. Parts 306 are linked together in a chain-like manner and are individually biased by springs 303 as shown in Figs. 12 and 13. In the interest of clarity only one of these springs has been shown in Fig. 12. Depending upon the positions which the various members 302 assume, the shape of this chain can be adjusted. As can be seen in Fig. 15, these chain-like members 306 are equipped with fins which prevent the passage of light between them, but still make is possible to move them relative to each other. In like manner the various members 302 have fins, as shown in Fig. 14, again to prevent the passage of light. The base 301 has a rectangular aperture 308 which is partly covered by the parts 302 and the chain formed by parts 306. For mechanical reasons this rectangular aperture is placed in an angular position with respect to the horizontal, but the deflecting means of the cathode ray tube 270 are so positioned that deflection plates 279 deflect the luminous line 310 in the direction of the arrow 279''.

A mechanism is provided to actuate all members 302 in unison. This mechanism comprises a shaft 320 which carries a hand wheel which may, for example be 65'', as shown in Fig. 1 and a number of cams 322, and is driven by hand wheel 321 which coacts with a dial calibrated in "Contrast Factor" values. The cams 322 are in operative contact with cam following rollers 323 which are mounted on levers 324. One end of each lever 324 is supported by a stationary pivot 325, and the other end of each lever is in contact with an aforementioned roller 305 which is attached to the upper end of a member 302.

It will be clear that rotation of hand wheel 65'' will cause these levers to assume different positions in accordance with the configuration of the various cams 322. These positions are again transferred to members 302, and result in different shapes assumed by the chain formed by elements 306. Various shapes are shown in dotted lines in Fig. 12, and each of these shapes represents the relation between exposure and positive densities of a selected grade of sensitized sheet under the selected contrast conditions, for example, for a given time and temperature of development.

The length of the luminous line 310 in Fig. 12 represents the positive density $D_p$, and its distance from a point of origin 330, in the direction of arrows 279' represents the magnitude (Log $E_0$) —$D_n$, where $E_0$ is an exposure time and $D_n$ a negative density. It is, therefore, clear that any change of exposure merely causes any of the curves shown in dotted lines to move parallel to itself in the direction of arrow 279'. While it would be possible to move the entire cathode ray tube in this manner relative to the mask, it is more convenient to perform this movement electrically by impressing additional bias upon the deflection plates 279. It is for this reason that potentiometer 284 is constructed differently from the other potentiometers and is connected to a hand wheel which coacts with a dial calibrated in exposure time values. This hand wheel may, for example, be 65' shown in Fig. 1.

The photo-electric cell which receives that part of the light emitted by the luminous line 310 formed upon the screen of cathode ray tube 270 passing the mask 300 may again be of any desired type, and again a photo multiplier type 272 is shown, the various electrodes of which are again connected to corresponding taps of a potentiometer 250 energized by a battery 251. The current circulating in the last loop causes certain voltage to pile up on a resistor 252. This voltage then represents and is proportional to the positive density which is to be expected from a given negative as printed under the conditions determined by the configuration to which mask 300 has been adjusted by the operator, and by the position of potentiometer 284.

*Masking network*

Three color prints are made by the subtractive process, i. e., they contain three superimposed layers which are formed by cyan, magenta and yellow dyes, respectively. These dyes are sometimes called minus red, minus green and minus blue, and as these names indicate, for example the cyan dye, is supposed to absorb red light only and to reflect green and blue light without loss. As a matter of fact, no cyan dye is known which will even remotely meet this condition, and all cyan dyes absorb in addition to the red light also relatively large quantities of green and blue light. In other words the cyan image does not merely represent densities which weaken red light (usually called, for the sake of brevity, "red" densities), but also "blue" and "green" densities which are not wanted. The same condition holds true in varying degrees for the magenta and yellow dyes which both absorb appreciable amounts of light which they are supposed to reflect.

This condition can be corrected by a process which is called "masking." In order to remove the unwanted blue and green densities in the case of the cyan (minus red) image, the separation negative taken through the red filter is combined with positive transparencies printed from the negatives made through the blue and green filter. The two other separation negatives are likewise combined with positives printed from the separation negatives made through the filters of the two other colors, respectively.

For a more scientific explanation of the theory underlying this process, reference is made to the extensive literature which exists on this subject, for example, Carl W. Miller, Principles of Photographic Reproduction, MacMillan Company, New York, 1942, page 313 et. seq.

The masking network represents an electric analogue to the process just described. Referring to Fig. 2, the output voltage of unit 58 which represents the density of the various points of the red filter negative is additively combined with the output voltage of the negative-positive converters 65 and 64 which represent, respectively, densities of the positives printed from the green filter negative and the blue filter negative as delivered by the units 57 and 56. The voltage at point 68, therefore, represents the sum of the three or the density of the corrected, masked red filter separation negative.

The two other separation negatives are treated in a like manner. The output voltage of unit 57 which represents the density of the green filter negative is additively combined with the output voltage of units 63 and 64 which, respectively, represent positive prints made from the separation negatives made through the red and blue filters which in turn are represented by the output voltages of units 58 and 56. Therefore, the voltage prevalent at points 67 represents densities of the corrected green filter negative.

Finally, the density of the blue filter separation negative, i. e., the output voltage of unit 56 is corrected by the addition of voltages delivered by the negative-positive converters 60 and 61 which represent, respectively, the densities of positive prints made from the separation negatives taken through the red and green filters which in turn are represented by the output voltages of units 57 and 58. The voltage at point 66, therefore, represents the density of the corrected blue filter negative.

The circuit by which these voltages are added is only shown schematically in block form in Fig. 2. In reality, the output voltage of the various units will, in a well-known manner, be impressed upon the resistors of high resistance which in turn are connected in series, so that the voltages built up across three of these resistors represent the sum of the three individual voltages.

The network described up to this point assumes the most complete state of correction for the three separation negatives in which each of the three negatives is combined with two positives printed from the two other negatives. In practice this procedure is sometimes simplified and only those images are masked which are later composed of those dyes which show the most glaring defects, and the other images later formed by dyes which have relatively good absorption and reflection characteristics may not be corrected. The latter refers usually to the yellow dye which most nearly comes up to its expected theoretical characteristics, i. e., it absorbs relatively little light of the red and green colors. In this case some of the negative-positive converters described in the previous paragraph may be omitted.

In practice the corrected masked separation negatives are printed and the positive prints are then in the usual manner dyed and combined upon a common white base. The printing process is simulated in this analogue computer by the three negative-positive converters 72, 71 and 70 which receive input voltages representing densities of the corrected separation negatives as prevalent at points 68, 67, and 66. The output of these three converters 72, 71 and 70 then represents directly the densities of the positive prints which eventually will form the colored image.

Indicating cathode ray tubes

The last component part of the computer is formed by three indicating cathode ray tubes. The fluorescent screens of these tubes are shown in Fig. 1 and they are again shown schematically as three circles in Fig. 2. The tubes are of conventional design and are connected to conventional supply circuits. These elements have, therefore, not been shown in detail. Each tube contains in the customary manner a heated cathode, a control grid, at least one focusing element, two sets of deflection elements arranged at right angles to each other, and a fluorescent screen. The supply circuit consists of a suitable source of voltage and a potentiometer which has the necessary taps to which the various elements of the cathode ray tube are connected. The control grids have a fixed bias, i. e., the light intensity is constant during the operation of the device.

It is the purpose of these tubes to compare densities of the original test object to densities of the hypothetical print made from the three separation negatives. For this purpose the output voltage of the units 70, 71 and 72 is connected to the vertical deflection elements and the output voltage of the unit 55 which represents densities of the original test object is connected to the horizontal deflection elements of these tubes as shown in the diagram of Fig. 2.

The test object was shown in Fig. 3 and consists, preferably, of three wedge prints as shown. Due to this arrangement, the horizontal deflection of the three luminous spots formed on the screens of tubes 73, 74 and 75 will, during each scanning movement, three times return to the point of origin or, in other words, three curves will be formed upon the screens of each of the tubes 73, 74 and 75 which all seem to originate in the same point. This is somewhat confusing, since it renders the identification of these three curves difficult and it is, therefore, desirable to provide means by which the three curves can be separated. This could conceivably be done by electrical means, for example by imposing a certain bias voltage in three steps upon the horizontal deflection means, but it is simpler to do this biasing optically by combining the test object as well as the three separation negatives made therefrom with a biasing mask shown in Fig. 4. This mask is a transparency which has three separate parts and each has a different, but in itself, constant, gray density. In this manner the displays upon the screens of the indicating cathode ray tubes will automatically each show three curves which are sufficiently displaced relative to each other so that identification becomes simple.

Operation

The operation of the device is as follows: The operator first depresses push button 33, thereby recording a saw tooth wave upon one of the magnetic tracks of the moving magnetic ribbon 40. This trace is used later to energize the moving pencils of light of the scanning unit 20 for all recordings.

A test object is then prepared which, preferably, has the apeparance of Fig. 3. This test object is made on the same sensitized material that is later used for the finished print. During the first recording it is used in its black and white stage; i. e., before it is bleached and dyed. It is inserted into unit 20 and its densities are recorded. For this purpose switch 23 is in the recording position and switch 24 is in the position called "test object."

The test object is then removed and bleached and dyed in such a manner that the left third is dyed with cyan, the middle portion with magenta and the right portion with yellow dye.

It is then photographed three times through a red, blue and green filter, respectively. It is preferable to make the photographs of precisely the same size as the test object.

The three separation negatives are developed and their density is then recorded by the machine. They are placed in the scanning unit 20 and during this process switch 23 is in the "recording" position and switch 24 is, respectively, in the position called "red," "green" and "blue."

The next step is to play back the recorded densities of the test object and the three separation negatives simultaneously. For this purpose switch 23 is in the play-back position and switch 24 is automatically rendered ineffective as can be seen from the diagram in Fig. 2.

As has been explained, each of the negative-positive converters is connected to two hand wheels which control, respectively, the assumed exposure time and the contrast factor. This holds true for the masking positives as well as for the final positive print. When the records are played back, it is at first assumed that they are not masked, i. e., all dials referring to the masking positives are turned back to zero. These dials are the upper two rows in Fig. 1. The corresponding dials for the negative-positive converter which simulate the final printing conditions are, however, put in a position which is more or less identical with that of an average print.

The displays which then can be observed on the screens of the tube 75, 74 and 73 are shown in Fig. 16. These displays illustrate the conditions which prevail with unmasked separation negatives.

On the face of tube 75, Fig. 16, three traces appear which show, respectively, the densities of a positive print made from the unmasked uncorrected red filter separation negative. The three traces refer, respectively, to the cyan section (upper left), to the magenta section (center) and to the yellow section (lower right) of the test object shown in Fig. 3. The displacement of the three branches which is caused by the optical biasing introduced by the mask shown in Fig. 4 can be seen.

If the three dyes had been perfect, only the upper left branch would have approximately the shape which is shown, but the center and the lower branch would each be represented by a straight horizontal line through the point of origin of the two respective branches. In other words only the left third of the test object which has been dyed cyan would weaken the red light with which the red filter separation negative has been taken. This is usually expressed by saying that this section would have "red" densities, i. e., densities which weaken red light. The two other thirds having been dyed magenta and yellow should theoretically reflect red light perfectly, or no "red" densities should be built up in these sections.

As a matter of fact, the center section, being magenta, absorbs about 20% of the incident red light and even the yellow section weakens the red light by approximately 5%. Therefore, the actual display on the screen of cathode ray tube 75 appears as shown in Fig. 16 and shows not only a branch 401 (in solid lines) which is the result of the red densities of the cyan portion of the test object, but also two branches 402 and 403 which are the result of the unwanted red densities of the magenta and yellow sections.

The displays on the screens of cathode ray tubes 74, and 73 which shows the conditions for the green and blue filter negatives, are similar. Referring to tube 74, branch 405 is indicative of the densities to green light which are offered by the magenta section of the test object. Branches 404 and 406 would with a perfect magenta dye appear as straight horizontal lines, but since both the cyan and the yellow dyes form unwanted densities for green light, actually the branches 404 and 406 will have approximately the shape shown in Fig. 16.

The densities for blue light are shown by tube 73. Branches 407 and 408 show the unwanted densities to blue light formed by the cyan and magenta section, respectively, and branch 409 shows the densities for blue light offered by the yellow section.

From these displays it will be obvious that in each case measures must be taken to remove the unwanted densities of two of the three sections of the test object. There is no photographic process possible by which densities can be deducted. So, instead of deducting the densities of one negative from the densities of another negative, we have to resort to the expedient of adding to the densities of a negative the densities of a positive made from another negative. In the analogue computer this operation is performed by adding voltages as shown in the masking network of Fig. 2.

The next operation, therefore, is to operate the dials in the upper two rows of the switchboard illustrated in Fig. 1 until the unwanted densities of the two respective portions of the test object disappear in each of the displays of the three cathode ray tubes 73, 74 and 75. Generally speaking this condition can only be approached because we are trying to cancel the density curve of one photographic material by the density curve of another photographic material, neither one of which is a straight line, but rather a pronounced S shaped curve. Since the masking positives are by necessity made on different material than the separation negatives, a complete cancellation is usually not possible. However, the ideal condition of a straight horizontal line through the point of origin can be sufficiently approached so that the corrected separation negative will yield prints far superior to those possible with unmasked separation negatives.

It has been explained in a previous paragraph that each positive-negative converter is equipped with two controls for the assumed exposure time and the assumed contrast factor, respectively. Generally speaking a change in exposure time merely shifts the entire curve parallel to itself in a vertical direction, whereas a change in contrast factor which generally, but not necessarily, means a change in developing time, changes the angle between the displayed curve and the horizontal, in other words, the gamma of the resulting positive. Both controls are manipulated until the best possible approximation has been reached, i. e., until the display upon the screen of the cathode ray tube for the two unwanted branches is as close to a horizontal line through the point of origin as possible.

A certain precaution has to be exercised, because it can be seen that the various adjustments are not entirely independent of each other. Therefore, the operator has to go through several cycles of adjustments, generally of progressively decreasing magnitude, until the best overall correction appears to have been reached.

It must also be realized that the introduction of masking, i. e., for example the removal of the unwanted densities represented by branches 402 and 403, causes a lowering of the gamma of the wanted density curve 401 which, after the compensation has been performed, will have approximately the shape shown in Fig. 16 in dotted lines. This is well known and is usually compensated for by developing the original separation negative to a gamma which is larger than unity, so that after the reduction due to masking it has the correct gamma which should be approximately equal to one. As a matter of fact, the same results can be achieved by manipulating the contrast factor, i. e., usually the developing time of the final print to be made from the masked separation negative. In the analogue computer the condition of the hypothetical final prints can be changed by manipulating the hand wheels in the lower row of the switchboard shown in Fig. 1 which, respectively, affect the exposure time, and the contrast factors of the final prints. These two magnitudes can be adjusted so that the loss of contrast due to masking is compensated for until at last the displays upon the screens of the indicating cathode ray tubes 73, 74 and 75 appear as shown in Fig. 17, i. e., the wanted densities 401', 405' and 409' are as nearly as possible lines forming a 45° angle with the horizontal and vertical, and the unwanted density branches 402', 403', 404', 406', 407', 408' are as nearly as possible horizontal lines through the respective points of origin.

When this result has been achieved, the operator can read on the dials associated with the various hand wheels shown in Fig. 1 the exposure times for all masking positives and for the final prints, as well as the contrast factors (which usually mean developing times) for the same. These factors, if properly applied, will yield a color print which, within the possibilities offered by the available dyes and filters, will be the best possible color print in which red, green and blue densities of the print are most nearly like those of the original test object.

It is a particular advantage of the process and the machine as outlined in the above specifications that the various photo-electric cells analyze only black and white specimens. In other words, the color sensitivity of the photo-electric cell is of no consequence. Since in practice this factor may offer considerable difficulties, this is an important advantage of this invention.

It is sometimes desirable to analyze not the final print, but, as an intermediate step, the condition of the separation negatives alone. It will be clear that it would be very simple in this case to omit the three negative-positive converters for the final prints 70, 71 and 72 and connect points 66, 67 and 68 directly to the vertical deflection elements of the cathode ray tube 73, 74 and 75. The displays in this case would be similar to the displays shown in Figs. 16 and 17, but, of course, the curves would be inclined the other way, i. e., the negative density would be high for low densities of the test object and vice versa.

Numerous other modifications and changes will occur to those skilled in the art, and should be considered to fall within the scope of this invention.

What I claim as new, is:

1. A computing device for photographic three color printing processes of the masking type comprising: a scanning unit, adapted to receive a test object and three separation negatives made therefrom, and including a moving pencil of light and a photo-electric cell with its supply circuit; a photo-cell current-density converter, adapted to convert currents passing said photo-cell into voltages proportional to photographic densities; a recording device, adapted to record said voltages proportional to densities; means to play back simultaneously the voltages representing densities of said test object and of said three separation negatives, respectively; means to co-ordinate said played back voltages whereby the voltages played back at any given time denote densities of the same point upon the test object and the three separation negatives, respectively; at least one negative-positive converter adapted to convert voltages representing densities of a photographic negative into voltages representing densities of a positive print made from said negative upon sensitized material of known characteristics under assumed exposure time and contrast conditions, including means under the control of the operator to adjust said last-named two conditions; a masking network, additively combining at least one voltage representing densities of one of the separation negatives with a voltage representing densities of at least one positive printed, respectively, from one of the two other separation negatives, said last-named voltages having been produced by negative-positive converters as described above, whereby at least one voltage is generated representing densities of a masked separation negative; and an indicating device showing the densities of said masked separation negative as a function of the corresponding densities of said test object.

2. A computing device for photographic three color printing processes of the masking type, comprising: a scanning unit, adapted to receive a test object and three separation negatives made therefrom, and including a moving pencil of light and a photo-electric cell with its supply circuit; a photocell current-density converter, adapted to convert currents passing said photocell into voltages proportional to photographic densities; a recording device, adapted to record said voltages proportional to densities; means to play back simultaneously the voltages representing densities of said test object and of said three separation negatives, respectively; means to coordinate said played back voltages whereby the voltages played back at any given time denote densities of the same point upon the test object and the three separation negatives, respectively; at least one negative-positive converter adapted to convert voltages representing densities of a photographic negative into voltages representing densities of a positive print made from said negative upon sensitized material of known characteristics under assumed exposure time and contrast conditions, including means under the control of the operator to adjust said last-named two conditions; a masking network, additively combining at least one voltage representing densities of one of the separation negatives with a voltage representing densities of at least one positive printed, respectively, from one of the two other separation negatives, said last-named voltages having been produced by negative-positive converters as described above, whereby at least one voltage is generated representing densities of a masked separation negative; an additional negative-positive converter, adapted to convert said last-named voltage into a voltage representing densities of a final positive print made from said masked separation negative upon sensitized material of known characteristics under assumed exposure time and contrast conditions, including means under the control of the operator to adjust said last-named two conditions; and an indicating device showing the densities of said final positive print as a function of the corresponding densities of said test object.

3. In a device according to claim 1, said test object having three parts placed side by side, each part comprising a pattern of elements ranging from the highest to the lowest density and arranged on a common straight line intersecting all three parts, said patterns formed by a black and white silver image made on a sheet of the same photographic print material on which the three final prints will be made later, said test object adapted to be analyzed by said scanning unit in its black-and-white state, but to be bleached and its three parts dyed with cyan, magento and yellow dyes, respectively, before said three separation negatives are made therefrom through red, green and blue filters, respectively, said dyes having the same chemical composition, concentration and application time and temperature as the ones to be applied later to the final prints forming the actual colored image.

4. A device according to claim 1, said scanning unit comprising a cathode ray tube, including a cathode, adapted to emit electrons, a screen adapted to emit light when struck by electrons, a control grid disposed between said cathode and said screen, means to accelerate said electrons toward said screen, means to focus said electrons to a point upon said screen, means to deflect said electrons whereby a moving luminous point is formed upon said screen, said deflecting means including a source of saw-tooth shaped voltage waves, means causing said luminous spot to illuminate one point at a time of the test object or of one of the separation negatives, a photo-electric cell placed in a position relative to the screen of said cathode ray tube where it is adapted to measure the intensity of the light of said luminous spot, as weakened by the density of the point of the test object or of one of the separation negatives which it illuminates at any given instance.

5. A device according to claim 1, said scanning unit comprising a first cathode ray tube, including a cathode, adapted to emit electrons, a screen adapted to emit light when struck by electrons, a control grid disposed between said cathode and said screen, means to impress upon said grid a negative voltage with respect to said cathode, means to accelerate said electrons toward said screen, means to focus said electrons to a point upon said screen, means to deflect said electrons whereby a moving luminous point is formed upon said screen, said deflecting means including a source of saw-tooth shaped voltage waves, means causing said moving luminous spot to illuminate one point at a time of the test object or of one of the separation negatives, a first photo-electric cell placed in a position relative to the screen of said first cathode ray tube where it is adapted to measure the intensity of the light of said luminous spot, as weakened by the density of the point of the test object or of one of the separation negatives which it illuminates at any given instance; said photocell current-density converter comprising a second cathode ray tube, an apertured mask, and a second photo-electric cell, said second cathode ray tube being independent of the first cathode ray tube and including a screen, means to form a luminous line upon said screen and means to deflect said line, said last-named means operatively connected to the first photo-electric cell actuated by the current passing said photo-electric cell, said apertured mask placed immediately in front of the screen of said second cathode ray tube, made from opaque material and having an aperture with a configuration substantially according to the formula $$Y = \frac{A}{C} \cdot X \left[ 10^{-\frac{X}{B}} \right]$$

where Y is the width of said aperture in a direction parallel to said luminous line, X the distance from a point of reference, in a direction perpendicular to said luminous line, and A, B and C are constants, and said second photo-electric cell being independent of the first photo-electric cell positioned opposite the screen of the second cathode ray tube, receiving light therefrom and operatively connected to the grid of the first cathode ray tube mentioned in this claim, whereby a negative voltage proportional to the width of said aperture at the point occupied by said luminous line at any given instance is added to the said negative voltage impressed upon the control grid of the first cathode ray tube and whereby the brightness of the light emitted by the screen of said first cathode ray tube is automatically modulated in accordance with the density of the element being scanned at any given instance.

6. A device according to claim 1, said recording device comprising a ribbon of magnetizable material, means to magnetize said ribbon along a plurality of parallel magnetic tracks in accordance with the respective intensities of said currents, and means to move said ribbon, during the recording process, past said magnetizing means; said means to play back said voltages simultaneously comprising a plurality of magnetic pick-ups, equal in number to the number of said magnetic tracks, and means to move said ribbon past said pick-ups during the play-back process.

7. A device according to claim 1, said scanning unit comprising a cathode ray tube, including a cathode, adapted to emit electrons, a screen adapted to emit light when struck by electrons, a control grid disposed between said cathode and said screen, means to accelerate said electrons toward said screen, means to focus said electrons to a point upon said screen, means to deflect said electrons whereby a moving luminous point is formed upon said screen, said deflecting means including a source of saw-tooth shaped voltage waves, means causing said luminous spot to illuminate one point at a time of the test object or of one of the separation negatives, a photo-electric cell placed in a position relative to the screen of said cathode ray tube where it is adapted to measure the intensity of the light of said luminous spot, as weakened by the density of the point of the test object or of one of the separation negatives which it illuminates at any given instance, said recording device comprising a ribbon of magnetizable material, means to magnetize said ribbon along a plurality of parallel magnetic tracks in accordance with the respective intensities of said currents, and means to move said ribbon, during the recording process, past said magnetizing means; said means to play back said voltages simultaneously comprising a plurality of magnetic pick-ups, equal in number to the number of said magnetic tracks, and means to move said ribbon past said pick-ups during the play back process; said means to coordinate said played back voltages comprising a linear sweep circuit generating a saw-tooth wave shaped voltage, means to record, prior to the actual operation of the device, said saw tooth wave voltage on one of the magnetic tracks referred to above, means to play back said recorded saw-tooth voltage during each of the periods when the respective densities of the test object and of the three separation negatives are recorded, and means operatively connecting said means to deflect the electrons within said cathode ray tube to said played back saw-tooth voltage.

8. A device according to claim 1, said negative-positive converter comprising a cathode ray tube, an opaque apertured mask, and a photo-electric cell distinguished from the cell mentioned in claim 1, said cathode ray tube comprising means to form a beam of electrons, means to accelerate said beam, a screen capable of light emittance when struck by electrons, means causing said beam to form a straight luminescent line upon said screen, and means, actuated by said voltage which is proportional to said negative density, to deflect said beam and thereby said luminescent line in a direction at right angles to itself, said mask, placed in front of said screen, and having a light transmitting aperture of such configuration that its width parallel to said line at different points bears the same relation to its distance from a given point of reference in a direction at right angles to said line. as the density of the sensitized material selected for the positive print bears to different exposure values, and said photo-electric cell placed in front of said mask, adapted to receive that portion of the light emitted from said luminescent line which passes said aperture, operatively connectd to an electric circuit, and delivering an output voltage proportional to the density of a hypothetical positive print made from said negative.

9. A device according to claim 1, said negative-positive converter comprising a cathode ray tube, an opaque apertured mask, and a photo-electric cell distinguished from the cell mentioned in claim 1, said cathode ray tube comprising means to form a beam of electrons. means to accelerate said beam, a screen capable of light emittance which struck by electrons, means causing said beam to form a straight luminescent line upon said screen, and means, actuated by said voltage which is proportional to said negative density, to deflect said beam and thereby said luminescent line in a direction at right angles to itself, means to add a second voltage to said last-named voltage, the magnitude of said second voltage being constant during the operation of the device, but adjustable by the operator in accordance with an assumed exposure time of the printing process of said positive print, said mask, placed in front of said screen, and having a light transmitting aperture of such configuration that its width parallel to said line at different points bears the same relation to its distance from a given point of reference in a direction at right angles to said line, as the density of the sensitized material selected for the positive print bears to different exposure values, means under the control of the operator to change the configuration of said aperture in accordance with an assumed contrast factor of said positive print, and said photo-electric cell placed in front of said mask, adapted to receive that portion of the light emitted from said luminescent line which passes said aperture, operatively connected to an electric circuit, and delivering an output voltage proportional to the density of a hypothetical positive print made from said negative.

10. A device according to claim 1, said recording device comprising a ribbon of magnetizable material, means to magnetize said ribbon along a plurality of parallel magnetic tracks in accordance with the respective intensities of said currents, and means to move said ribbon, during the recording process, past said magnetizing means; said means to play back said voltages simultaneously comprising a plurality of magnetic pick-ups, equal in number to the number of said magnetic tracks, and means to move said ribbon past said pick-ups during the play-back process; said masking network comprising means to connect at least two voltages in series, one of these voltages being generated by one of said magnetic pick-ups and thereby representing densities of one separation negative, the other voltage being generated by a negative-positive converter, whose input voltage is in turn generated by another magnetic pick-up and represents densities of another separation negative.

11. A device according to claim 1, said recording device comprising a ribbon of magnetizable material, means to magnetize said ribbon along a plurality of parallel magnetic tracks in accordance with the respective intensities of said currents, and means to move said ribbon, during the recording process, past said magnetizing means; said means to play back said voltages simultaneously comprising a plurality of magnetic pick-ups, equal in number to the number of said magnetic tracks, and means to move said ribbon past said pick-ups during the play-back process; said masking network comprising means to connect three voltages in series, one of these voltages being generated by one of said magnetic pick-ups and thereby representing densities of one separation negative, the two other voltages being generated by two negative-positive converters, respectively, whose input voltages in turn are generated by the two other magnetic pick-ups, and represent densities of the two other separation negatives.

12. A device according to claim 1, said recording device comprising a ribbon of magnetizable material, means to magnetize said ribbon along a plurality of parallel magnetic tracks in accordance with the respective intensities of said currents, and means to move said ribbon, during the recording process, past said magnetizing means; said means to play back said voltages simultaneously comprising a plurality of magnetic pick-ups, equal in number to the number of said magnetic tracks, and means to move said ribbon past said pick-ups during the play-back process; said masking network comprising three parts, each part comprising means to connect three voltages in series, one of these voltages being generated by one of said magnetic pick-ups and thereby representing densities of one separation negative, the other two voltages being generated by two negative-positive converters, respectively, whose input voltages in turn are generated by the two other magnetic pick-ups, and represent densities of the two other separation negatives.

13. A device according to claim 1, said indicating device comprising at least one cathode ray tube, including a cathode, adapted to emit electrons, a screen, adapted to emit light when struck by electrons, means to accelerate said electrons toward said screen, means to focus said electrons to a point upon said screen, and two independent means to deflect said electrons in two directions, respectively, which are at right angles to each other, the first of said deflecting means operatively connected to a voltage representing densities of a masked separation negative made through a filter of one primary color, and the second of said deflecting means operatively connected to a voltage representing densities to light of the same primary color of a test object from which said separation negative was made.

14. A device according to claim 2, said indicating device comprising three cathode ray tubes, each tube including a cathode, adapted to emit electrons, a screen, adapted to emit light when struck by electrons, means to accelerate said electrons toward said screen, means to focus said electrons to a point upon said screen, and two independent means to deflect said electrons in two directions, respectively, which are at right angles to each other, the first of said deflecting means operatively connected to a voltage representing densities of a print made from one of the masked separation negatives made through a filter of one primary color, and the second of said deflecting means operatively connected to a voltage representing densities to light of the same primary color of the test object from which said separation negative was made.

15. A device according to claim 1, said test object having three parts placed side by side, each part comprising a pattern of elements ranging from the highest to the lowest density and arranged on a common straight line intersecting all three parts, said patterns formed by a black-and-white silver image made on a sheet of the same photographic print material on which the three final prints will be made later, said test object adapted to be analyzed by said scanning unit in its black-and-white state, but to be bleached and its three parts dyed with cyan, magenta and yellow dyes, respectively, before said three separation negatives are made therefrom through red, green and blue filters, respectively, said dyes having the same chemical composition, concentration and application time and temperature as the ones to be applied later to the final prints forming the actual colored image; said indicating device comprising at least one cathode ray tube, including a cathode, adapted to emit electrons, a screen, adapted to emit light when struck by electrons, means to accelerate said electrons toward said screen, means to focus said electrons to a point upon said screen, and two independent means to deflect said electrons in two directions, respectively, which are at right angles to each other, the first of said deflecting means operatively connected to a voltage representing densities of a masked separation negative made through a filter of one primary color, and the second of said deflecting means operatively connected to a voltage representing densities to light of the same primary color of said test object from which said separation negative was made, and means to segregate the luminous traces appearing on the screen of said cathode ray tube denoting the conditions of the three repective parts of the test object and of the separation negatives made therefrom, said means comprising a transparent mask of the same size as said test object and adapted to be placed over it during the scanning process, said mask having three parts, each as large as the corresponding part of the test object, and each having a different, but in itself uniform density, whereby said three different densities are, respectively, added to the densities of the three parts of the test object, and whereby the corresponding luminous traces on the screen of the cathode ray tube are displaced relative to each other.

ALFRED SIMMON.

REFERENCES CITED

The following references are of record in the file of this patent:

UNITED STATES PATENTS

| Number | Name | Date |
| --- | --- | --- |
| 2,375,966 | Valensi | May 15, 1945 |
| 2,434,561 | Hardy et al. | Jan. 13, 1948 |